US008169102B2

(12) United States Patent  (10) Patent No.: US 8,169,102 B2
Lin et al.  (45) Date of Patent: May 1, 2012

(54) VERTICAL-AXIS WINDPOWER FAN UNIT AND MODULE AND POWER GENERATING SYSTEM THEREOF

(75) Inventors: Jung-Kuei Lin, Hsinchu (TW);
Kuo-Tung Tseng, Taipei (TW);
Yun-Yuan Chang, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 413 days.

(21) Appl. No.: 12/478,454

(22) Filed: Jun. 4, 2009

(65) Prior Publication Data

US 2010/0253084 A1  Oct. 7, 2010

(30) Foreign Application Priority Data

Apr. 3, 2009 (TW) ................................ 98111174 A

(51) Int. Cl.
*F03D 9/00* (2006.01)
*H02P 9/04* (2006.01)
(52) U.S. Cl. .......................................... 290/55; 290/44
(58) Field of Classification Search .................... 290/44, 290/55; 415/4.1, 4.2, 4.5, 2.1; 60/398; 416/111, 416/117, 119, 124
See application file for complete search history.

(56) References Cited

U.S. PATENT DOCUMENTS

| 1,654,165 | A | * | 12/1927 | Felt | 416/49 |
| 4,084,102 | A | * | 4/1978 | Fry et al. | 290/55 |
| 4,245,958 | A | * | 1/1981 | Ewers | 416/197 A |
| 5,424,622 | A | * | 6/1995 | Keller et al. | 318/375 |
| 6,784,566 | B2 | * | 8/2004 | Thomas | 290/55 |
| 6,913,435 | B2 | * | 7/2005 | Seki | 415/4.1 |
| 2007/0224029 | A1 | * | 9/2007 | Yokoi | 415/4.2 |
| 2008/0095631 | A1 | | 4/2008 | Bertony | |
| 2008/0253889 | A1 | | 10/2008 | Krivcov et al. | |
| 2009/0035134 | A1 | * | 2/2009 | Kuo et al. | 416/119 |
| 2009/0110554 | A1 | * | 4/2009 | Dukovic et al. | 416/41 |
| 2009/0167027 | A1 | * | 7/2009 | Kato | 290/55 |
| 2010/0232965 | A1 | * | 9/2010 | Chang | 416/169 R |
| 2011/0133474 | A1 | * | 6/2011 | Haar | 290/55 |

* cited by examiner

*Primary Examiner* — Julio Gonzalez
(74) *Attorney, Agent, or Firm* — Morris Manning & Martin LLP; Tim Tingkang Xia, Esq.

(57) ABSTRACT

The present invention provides a vertical-axis windpower fan unit using a central axle having modulized design for assembling or disassembling quickly and includes supporting arms with capability of weight adjustment so as to balance the rotation of the fan unit. In one embodiment, the present invention further provides a coaxial fan module comprising a plurality of fan units coupled sequentially wherein a blade of each fan unit is disposed in the middle position with respect to the two blades of the adjacent fan unit for reducing unbalance and eliminating vibrational noise while the fan module is rotating. In addition, in another embodiment, the present invention further provides a power generating system comprising the coaxial fan module and a power generator unit coupled to the coaxial fan module so as to generate electricity.

31 Claims, 12 Drawing Sheets

VERTICAL-AXIS WINDPOWER FAN UNIT AND MODULE AND POWER GENERATING SYSTEM THEREOF

FIELD OF THE INVENTION

The present invention generally relates to a windpower generator and, more particularly, to a vertical-axis windpower fan unit, a vertical-axis windpower fan module and a vertical-axis windpower generating system using modulized fan units to generate electricity.

BACKGROUND OF THE INVENTION

Since the global climate change and environmental consciousness have attracted tremendous amount of attention, most industries related to human lives have developed green technologies, among which the energy technologies take the lead. The windpower generator is one of the most important energy technologies because windpower is clean, low greenhouse gas emission, and renewable. Therefore, most of the western countries have launched the development and application of the windpower generator.

The windpower generating system can be divided into the horizontal-axis and the vertical-axis power generating systems. The horizontal-axis power generating system has a fan with a horizontal rotation axis, while the vertical-axis power generating system has a fan with a vertical rotation axis. According to some reports, the vertical-axis windpower generating system has advantages over the conventional horizontal-axis windpower generating system such as advanced machining design, low manufacturing cost, low threshold wind speed, low noise and less light pollution. Therefore, it has great potential in commercial applications.

Referring to FIG. 1, which is a 3-D diagram of a dual-layer vertical-axis fan module disclosed in U.S. Pub. No. 20080095631. The vertical-axis fan module comprises two fan units. Each of the fan units comprising three twisted blades disposed therein. On each of the top and bottom ends, there is provided a connecting plate coupled to both ends of the blade. The blade module further comprises a rotation axle penetrating through the center of the connecting plate.

Moreover, as disclosed in U.S. Pub. No. 2008253889, a fan module with a dual-layer fan, as shown in FIG. 2, comprises a plurality of fan units. Each of the fan units comprises respectively three blades. On both ends of the three blades, there are provided respectively a connecting unit. Between two connecting units, there are a plurality of supporting arms connected to a rotation axle.

SUMMARY OF THE INVENTION

In view of the above, the present invention provides a vertical-axis windpower fan unit and a fan module. Each of the fan units uses a modulized design for assembling or disassembling quickly as a central axle so that the user is capable of connecting a plurality of fan units to form a fan module with a coaxial axle according to actual demands. Moreover, the central axle of each of the fan units includes blade supports with capability of weight adjustment so as to balance the rotation of the fan unit.

The present invention provides a vertical-axis windpower fan unit and a fan module. The interface between the blades and the blade supports use a connecting unit disposed inside the blades so that the end portion of the connecting unit protrudes out of the blades. Alternatively, a connecting unit is fixedly disposed on the blade to strengthen the connection between the blade and the blade supports. Moreover, the interface between the blade and the blade supports is connected to the blade so as to lower the manufacture cost of the blade by connecting the connecting unit and the blade supports.

The present invention provides a vertical-axis windpower generating system using a fan module with a plurality of fan units being connected to the power generator unit. The blades of each of the fan units are disposed between two blades of a connected fan unit so that the fan module remains balanced while rotating to keep stability of power generation and reduce noise.

In one embodiment, the present invention provides a vertical-axis windpower fan unit, comprising:

a central axle being provided with a connecting base on an external wall at each of both ends of the central axle, the central axle comprising a protruding portion at one end and a concave portion at the other end;

a pair of blade supports, each respectively comprising a plurality of independent supporting arms, the pair of blade supports being respectively connected to the connecting base at each of the both ends of the central axle so that the independent supporting arms of the pair of blade supports correspond to each other; and a plurality of blades, each respectively connected to the corresponding independent supporting arms of the pair of blade supports.

In another embodiment, the present invention provides a vertical-axis windpower fan module, comprising:

a first fan unit, comprising:

a first central axle being provided with a first connecting base on an external wall at each of both ends of the first central axle, the first central axle comprising a first protruding portion at one end and a first concave portion at the other end;

a pair of first blade supports, each respectively comprising a plurality of first independent supporting arms, the pair of first blade supports being respectively connected to the first connecting base at each of the both ends of the first central axle so that the first independent supporting arms of the pair of first blade supports correspond to each other; and a plurality of first blades, each respectively connected to the corresponding first independent supporting arms of the pair of first blade supports;

a second fan unit, comprising:

a second central axle being provided with a second connecting base on an external wall at each of both ends of the second central axle, the second central axle comprising a second protruding portion at one end and a second concave portion at the other end, wherein the second protruding portion is coupled to the first concave portion;

a pair of second blade supports, each respectively comprising a plurality of second independent supporting arms, the pair of second blade supports being respectively connected to the second connecting base at each of the both ends of the second central axle so that the second independent supporting arms of the pair of second blade supports correspond to each other; and a plurality of second blades, each respectively connected to the corresponding second independent supporting arms of the pair of second blade supports.

In another embodiment, the present invention further provides a vertical-axis windpower generating system, comprising:

a first fan unit, comprising:

a first central axle being provided with a first connecting base on an external wall at each of both ends of the first central axle, the first central axle comprising a first protruding portion at one end and a first concave portion at the other end;

a pair of first blade supports, each respectively comprising a plurality of first independent supporting arms, the pair of first blade supports being respectively connected to the first connecting base at each of the both ends of the first central axle so that the first independent supporting arms of the pair of first blade supports correspond to each other; and a plurality of first blades, each respectively connected to the corresponding first independent supporting arms of the pair of first blade supports;

a second fan unit, comprising:

a second central axle being provided with a second connecting base on an external wall at each of both ends of the second central axle, the second central axle comprising a second protruding portion at one end and a second concave portion at the other end, wherein the second protruding portion is coupled to the first concave portion;

a pair of second blade supports, each respectively comprising a plurality of second independent supporting arms, the pair of second blade supports being respectively connected to the second connecting base at each of the both ends of the second central axle so that the second independent supporting arms of the pair of second blade supports correspond to each other;

a plurality of second blades, each respectively connected to the corresponding second independent supporting arms of the pair of second blade supports; and a power generator unit comprising a connecting concave portion at one end so as to be coupled to the first protruding portion, the power generator unit receiving a power generated by the first and second fan units being rotating to generate electricity.

BRIEF DESCRIPTION OF THE DRAWINGS

The objects and spirits of various embodiments of the present invention will be readily understood by the accompanying drawings and detailed descriptions, wherein.

DETAILED DESCRIPTION OF THE PREFERRED EMBODIMENT

The present invention can be exemplified by but not limited to the preferred embodiment as described hereinafter.

Figure 2:
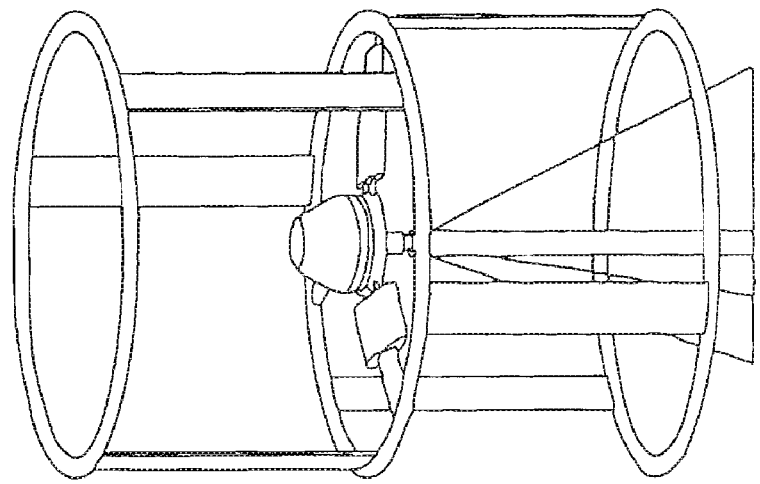
FIG. 2 is a schematic diagram of a fan module with a dual-layer fan disclosed in U.S. Pub. No. 2008253889.
Figure 1:
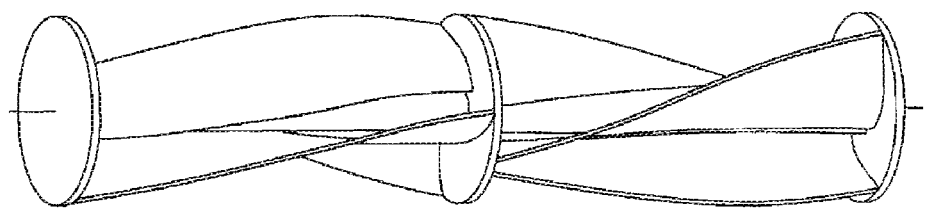
FIG. 1 is a 3-D diagram of a dual-layer vertical-axis fan module disclosed in U.S. Pub. No. 20080095631.
Figure 3:
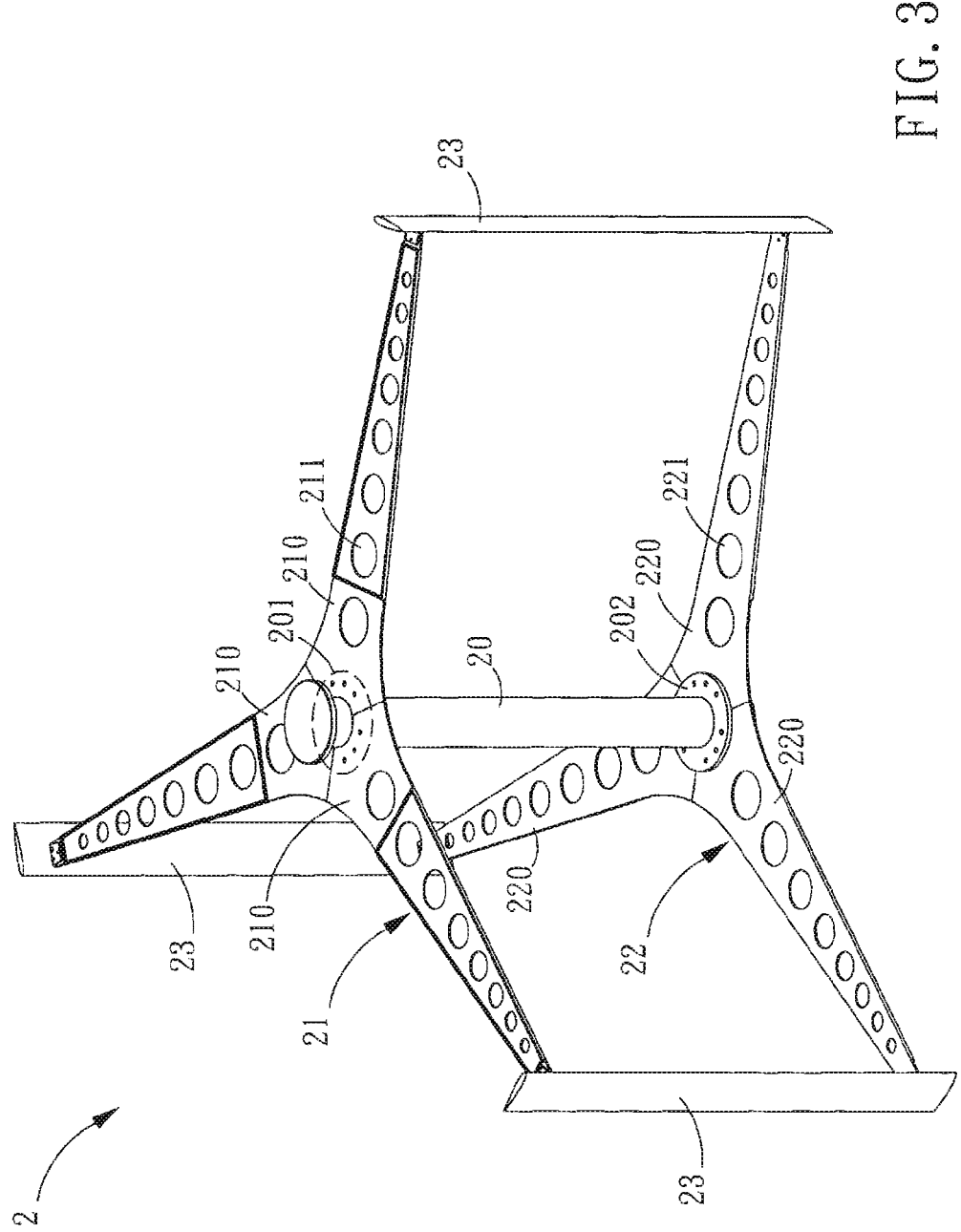
FIG. 3 is a 3-D diagram of a vertical-axis windpower fan unit according to one embodiment of the present invention.
Figure 4B:
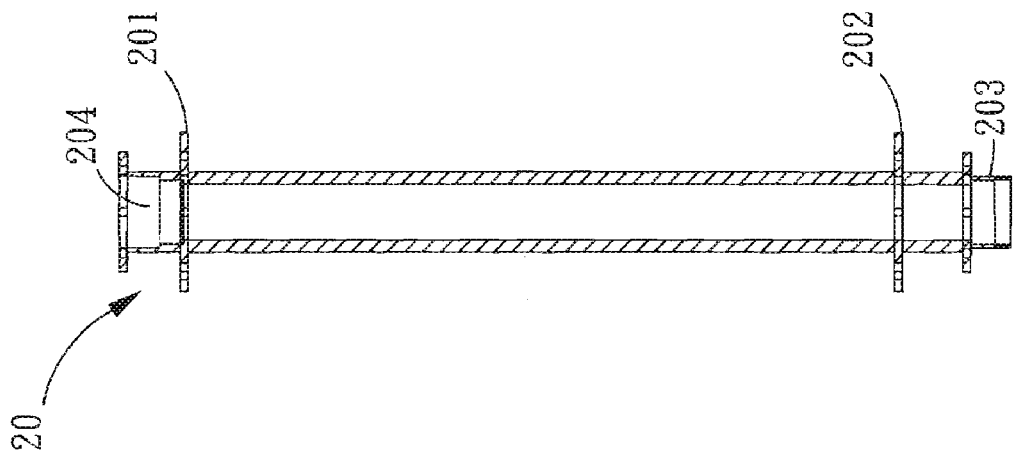
FIG. 4B is a cross-sectional diagram of a central axle.
Figure 4A:
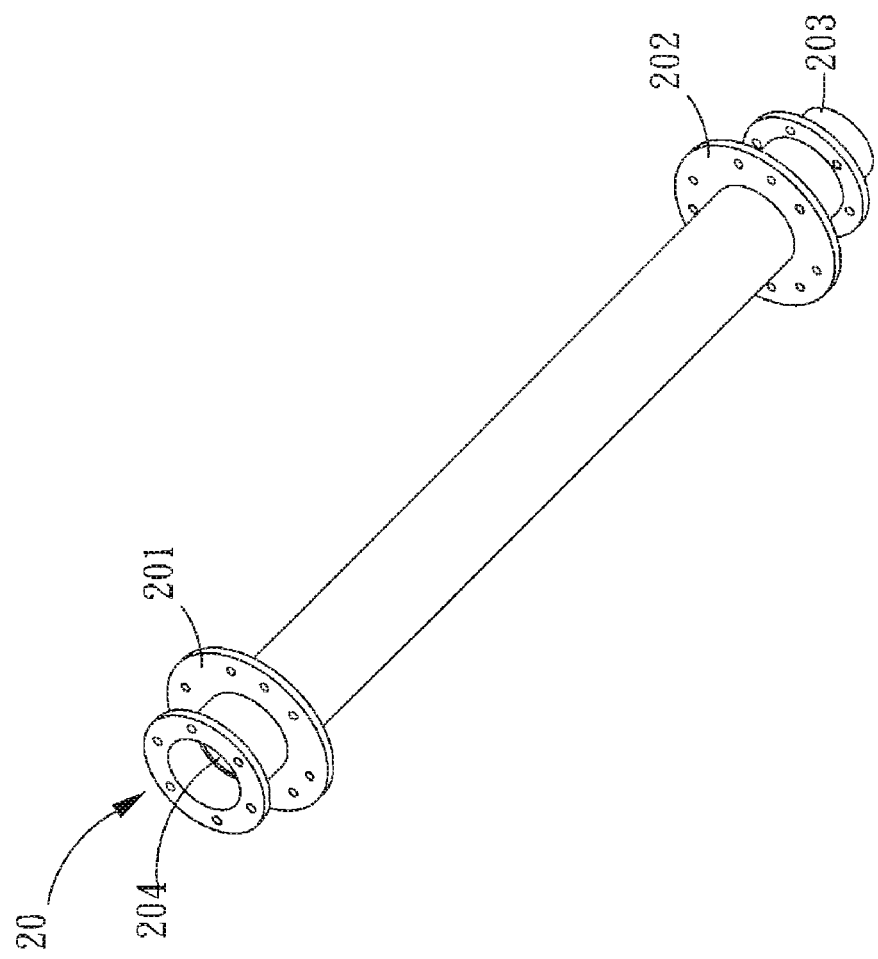
FIG. 4A is a 3-D diagram of a central axle.

Please refer to FIG. 3, which is a 3-D diagram of a vertical-axis windpower fan unit according to one embodiment of the present invention. The fan unit 2 comprise a central axle 20, a pair of blade supports 21 and 22 and a plurality of blades 23. As shown in FIG. 4A and FIG. 4B, wherein FIG. 4A is a 3-D diagram of a central axle 20 and FIG. 4B is a cross-sectional diagram of a central axle 20. The central axle 20 is provided with a connecting base 201/202 on an external wall at each of both ends of the central axle 20. The central axle 20 comprises a protruding portion 203 at one end and a concave portion 204 at the other end. Returning to FIG. 3, each of the pair of blade supports 21 and 22 respectively comprises a plurality of independent supporting arms 210 and 220. In the present embodiment, each of the pair of blade supports 21 and 22 respectively comprises three independent supporting arms 210 and 220. Each of the independent supporting arms 210 and 220 is respectively provided with a plurality of through holes 211 and 221 disposed thereon. The plurality of through holes 211 and 221 on each of the independent supporting arms 210 and 220 are disposed as a line from the blades 23 to the central axle 20 with apertures getting larger. The through holes are distributed according to the required weight. It is also possible that there is no through hole provided. The present invention is not limited by the distribution of the through holes as shown in the figures. The pair of blade supports 21 and 22 are respectively connected to the connecting base 201 and 202 at each of the both ends of the central axle 20 so that the independent supporting arms 210 and 220 of the pair of blade supports 21 and 22 correspond to each other. Each of the plurality of blades is respectively connected to the corresponding independent supporting arms 210 and 220 of the pair of blade supports 21 and 22 so that the plurality of blades are in parallel with the central axle 20.

Figure 5:
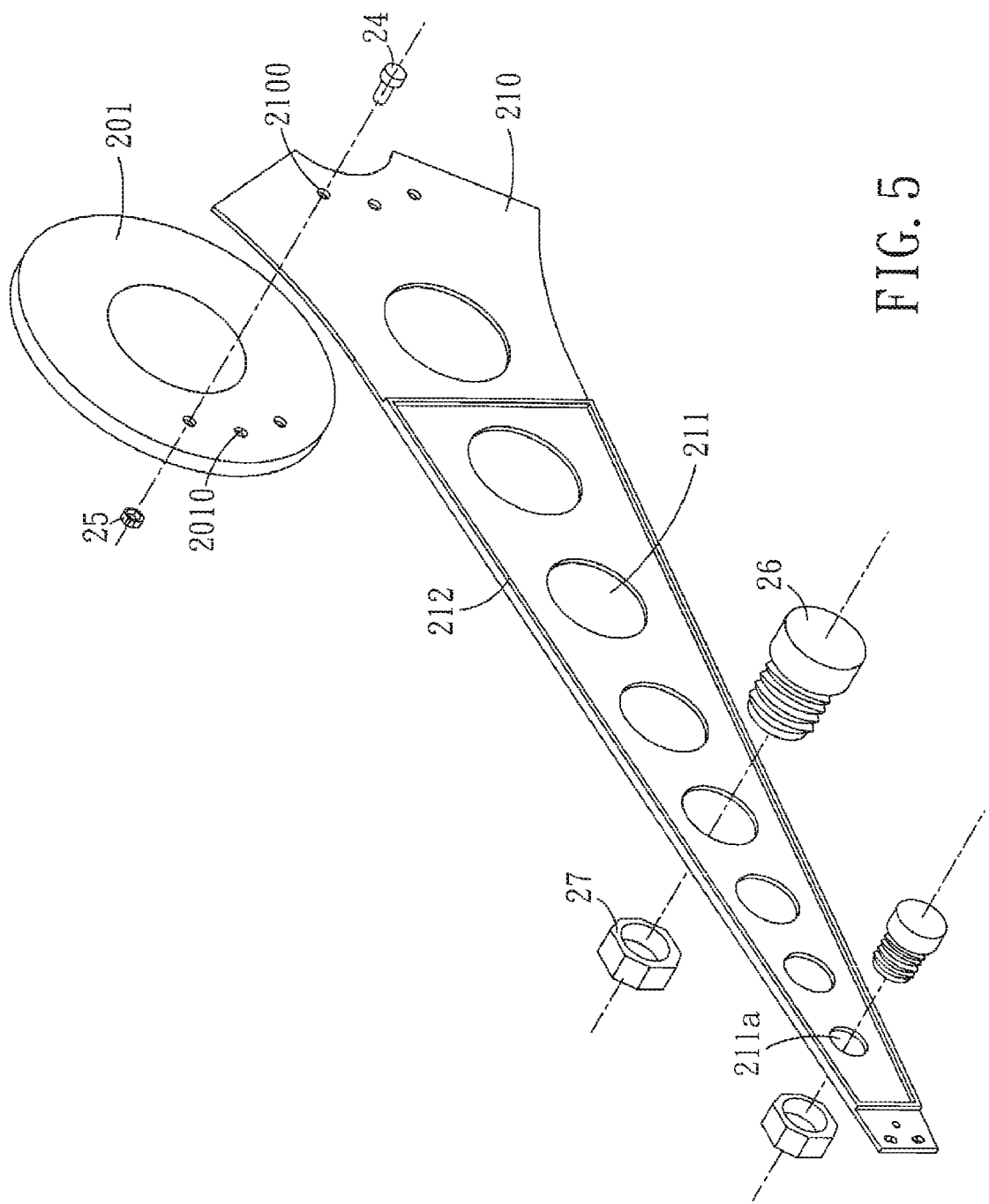
FIG. 5 is a schematic diagram of a combination of an independent supporting arm and a connecting base.

Moreover, taking the blade supports 21 for example, each of the independent supporting arms 210 may be formed in one process or by combining the plurality of independent supporting arms. In the present embodiment, the blade supports 21 comprise a plurality of independent supporting arms. With the design of the plurality of independent supporting arms, assembling and disassembling can be easier and the number of the independent supporting arms may be changed according to actual demands. As shown in FIG. 5, which is a schematic diagram of a combination of an independent supporting arm and a connecting base. Each of the independent supporting arms 210 is provided with a plurality of through holes 2100 disposed thereon corresponding to the through holes 2010 disposed on the connecting base 201 so that a screw bolt 24 is able to pass through. A screw nut 25 can be used to fasten the screw bolt 24 so that each of the independent supporting arms 210 can be fixed on the connecting base 201. Returning to FIG. 3, the plurality of through holes 211 and 221 on the independent supporting arms 10 and 220 are disposed to reduce the weight of the blade supports 21 and 22 and to provide a counter weight unit disposed therein. This is because the error due to the manufacture of the blade supports and the blade, which may cause unbalanced problems when the fan unit is rotating. Therefore, the counter weight unit and the through holes are provided to reduce the weight of the supporting arms and adjust the rotation of the fan unit.

Referring to FIG. 5, for the independent supporting arms 210, the through holes 211 on each of the independent supporting arms are disposed as a line from the blades to the central axle with apertures getting larger. Therefore, the user may choose counter weight units with different weights according to actual demands. In FIG. 5, the counter weight unit is a combination of a screw bolt 26 and a screw nut 27. If a lighter counter weight unit is required, a screw bolt and a screw nut are selected according to the aperture of the through hole 211a to be fixedly disposed on the independent supporting arm 210. Moreover, each of the independent supporting arms (taking the arm 210 for example) in the present invention is further provided with a protruding rib 212 to enhance the strength of the independent supporting arm 210 and prevent the independent supporting arms 210 form deformation.

Figure 6B:
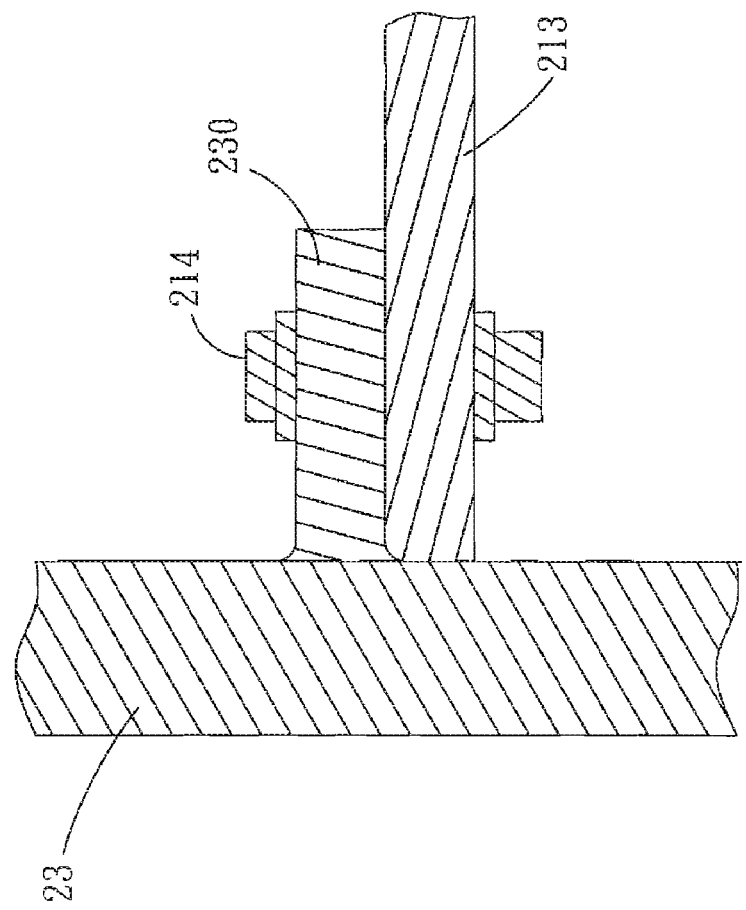
FIG. 6A and FIG. 6B show respectively a 3-D diagram and a cross-sectional diagram of a combination of a blade and blade supports according to the present invention.
Figure 6A:
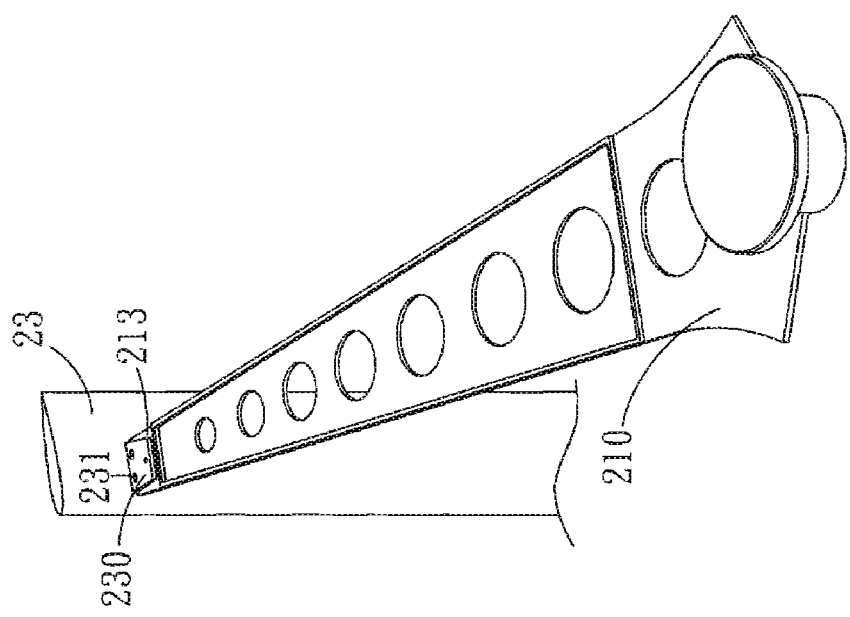
Figure 7B:
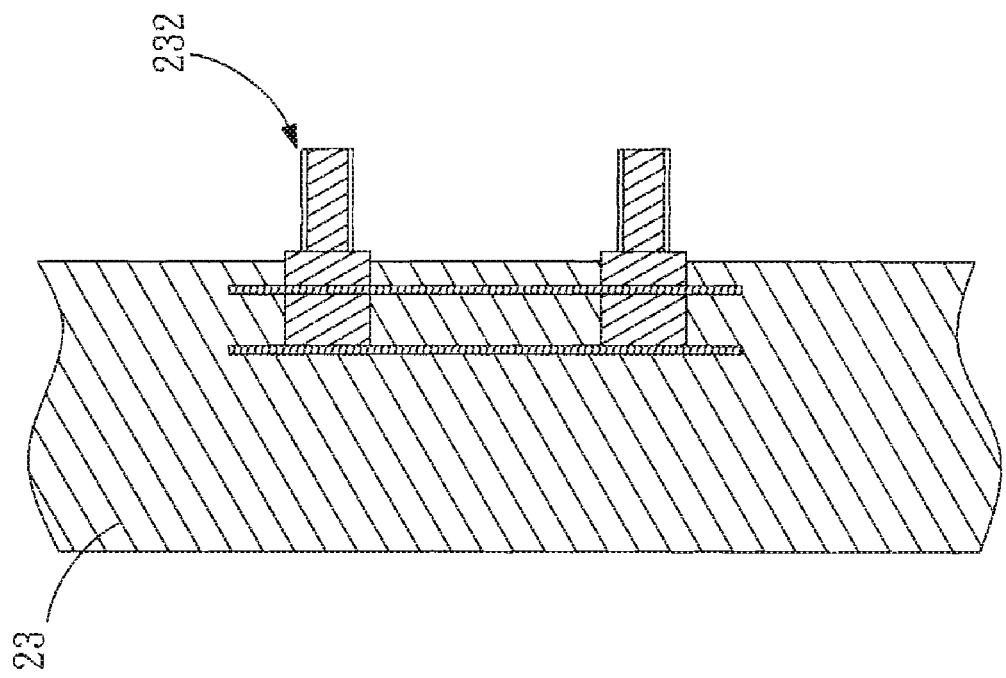
FIG. 7A to FIG. 7C are schematic diagrams of a combination of a blade and blade supports according to another embodiment of the present invention.
Figure 7A:
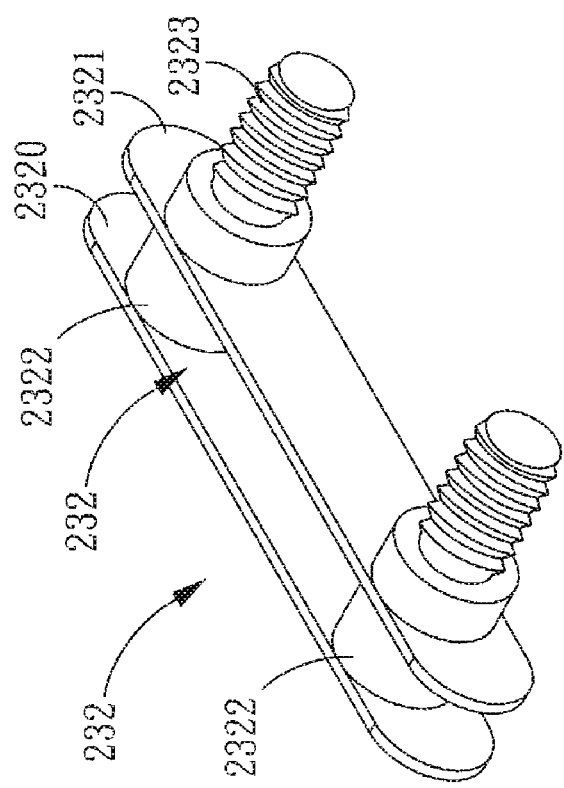
Figure 7C:
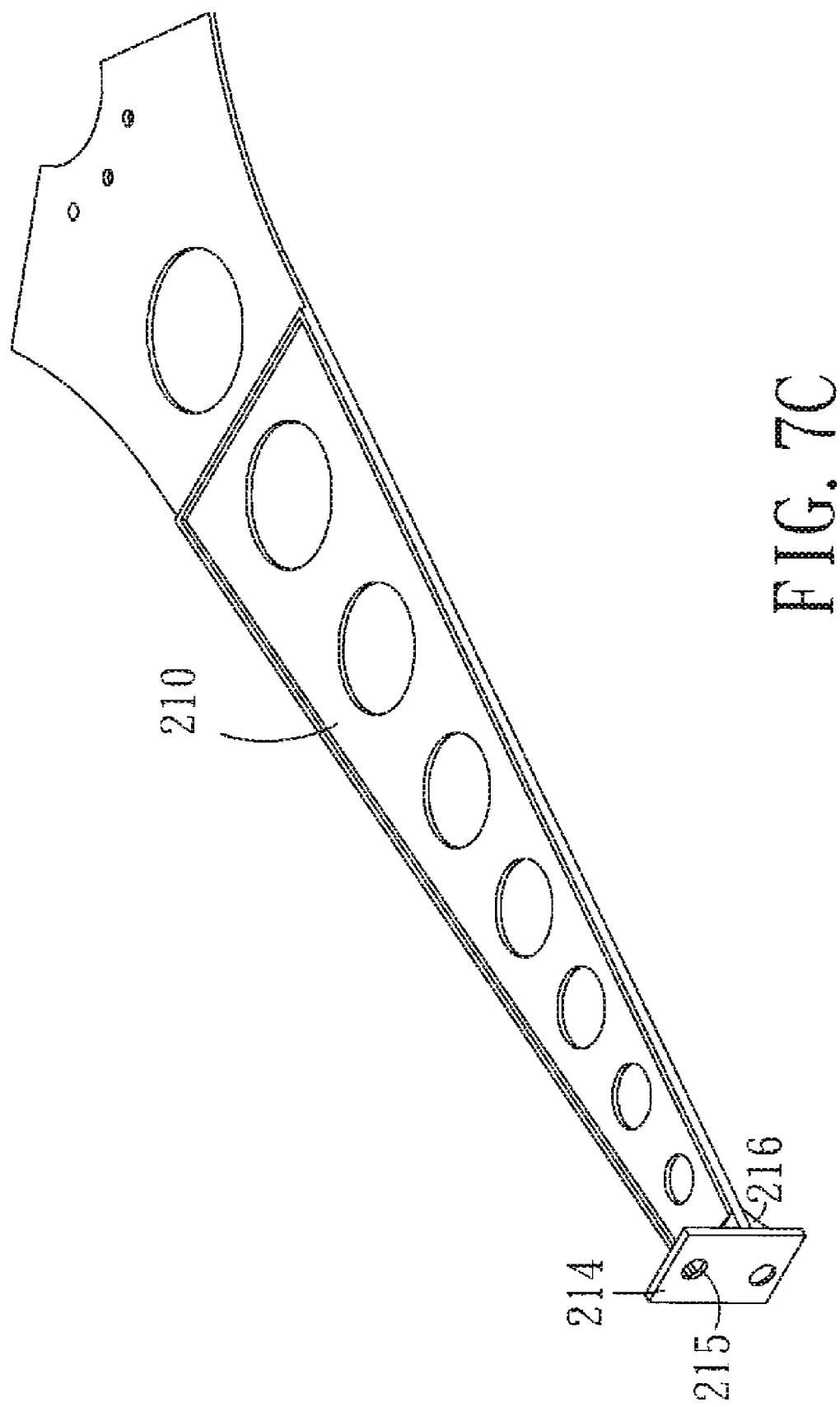

Returning to FIG. 3, each of the plurality of blades 23 is respectively connected to the corresponding independent supporting arms of the pair of blade supports. In the present invention, the blade 23 and the independent supporting arms 210 and 220 are connected as shown in FIG. 6A and FIG. 6B, which show respectively a 3-D diagram and a cross-sectional diagram of a combination of a blade and blade supports according to the present invention. In the present embodiment, the blade 23 is provided with a connecting unit 230 disposed thereon. The connecting unit 230 is provided with a plurality of openings 231. A connecting plate 213 extends from the independent supporting arms 210 corresponding to the blade and is provided with an opening corresponding to the opening 231. The connecting unit 230 and the connecting plate 213 are combined using a fastening device 214 (such as the screw nut and the screw bolt). As shown in FIG. 7A to FIG. 7C, which are schematic diagrams of a combination of a blade and blade supports according to another embodiment of the present invention. In the present embodiment, a connecting unit 232 is embedded inside the blade 23. The connecting unit 232 comprises two supporting bases 2322 and two connecting plates 2320 and 2321 connected to the two supporting bases 2322. A protruding pillar 2323 with a screw thread extends from each of the supporting bases 2322 to protrude out of the blades and to be connected to the independent supporting arms 210. The connecting plate 2321 is fixedly disposed on the supporting bases 2322.

The connecting unit is embedded in the blade 23 so that the protruding pillar protrudes out of the blade. Since the supporting bases 2322 are disposed inside the blade 23, the supporting bases 2322 can be combined with the material inside the blade 23 so that the connecting unit 232 is fixedly disposed in the blade 23. In the present invention, since both ends of the blade are respectively connected to the independent supporting arms of the blade supports, the connecting unit is disposed in the blade 23. As shown in FIG. 7C, one end of each of the independent supporting arms (taking the independent supporting arm 210 for example) is provided with a fastening plate 214 whereon through holes 215 are disposed corresponding to the protruding pillar 2323. To strengthen the fastening plate 214, a strengthening structure 216 is disposed between the fastening plate 214 and the independent supporting arm 210 to strengthen the structure between the fastening plate 214 and the independent supporting arm 210. When the protruding pillar 2323 passes through the through holes 215 on the fastening plate 214, a screw nut can be used to fasten the blade 23 on the protruding pillar so that the blade is fixedly disposed on the independent supporting arms 210.

Figure 8A:
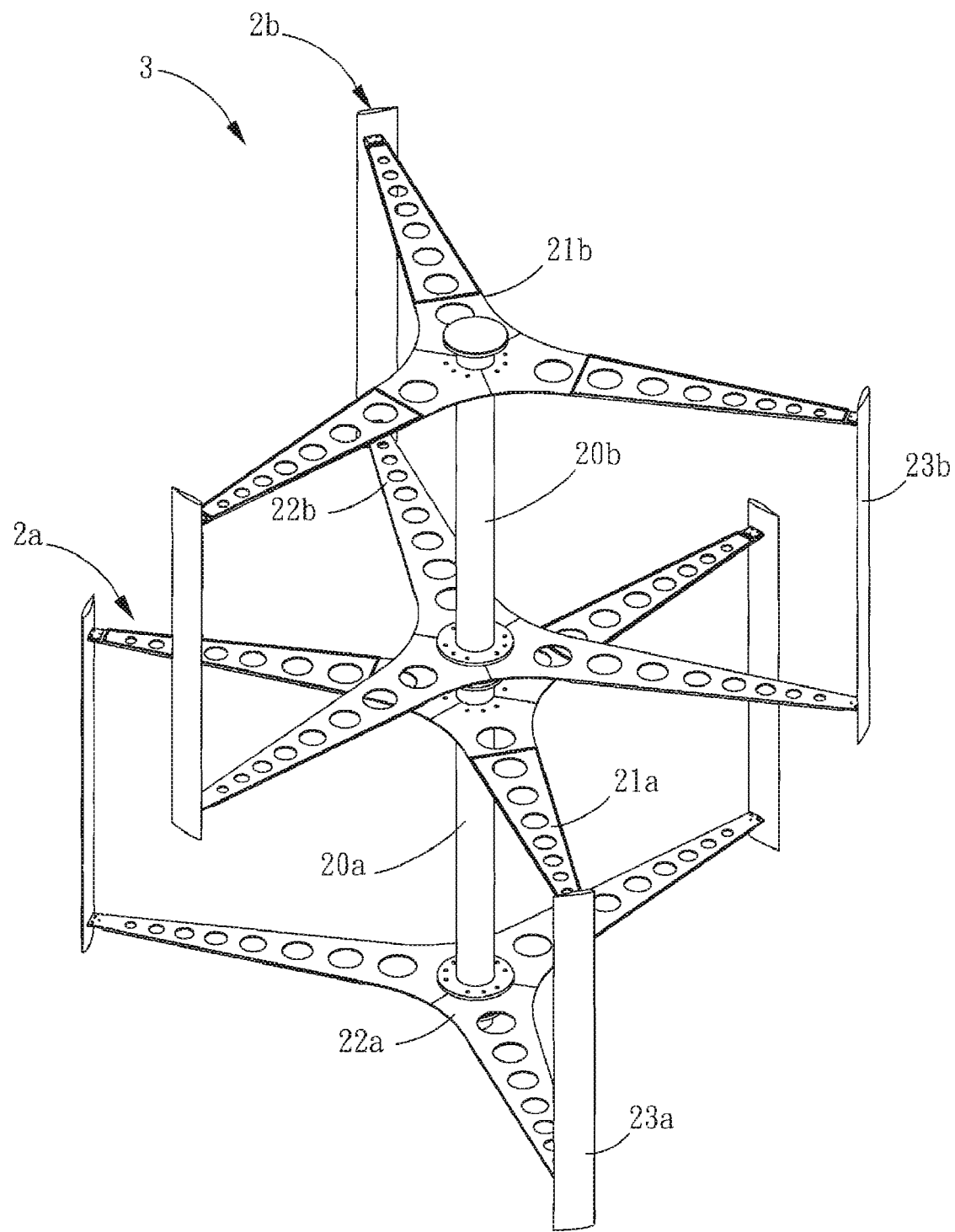
FIG. 8A to FIG. 8C show a 3-D diagram of a fan module, a 3-D diagram of connected central axles and a top view diagram of a fan module according to one embodiment of the present invention.
Figure 8B:
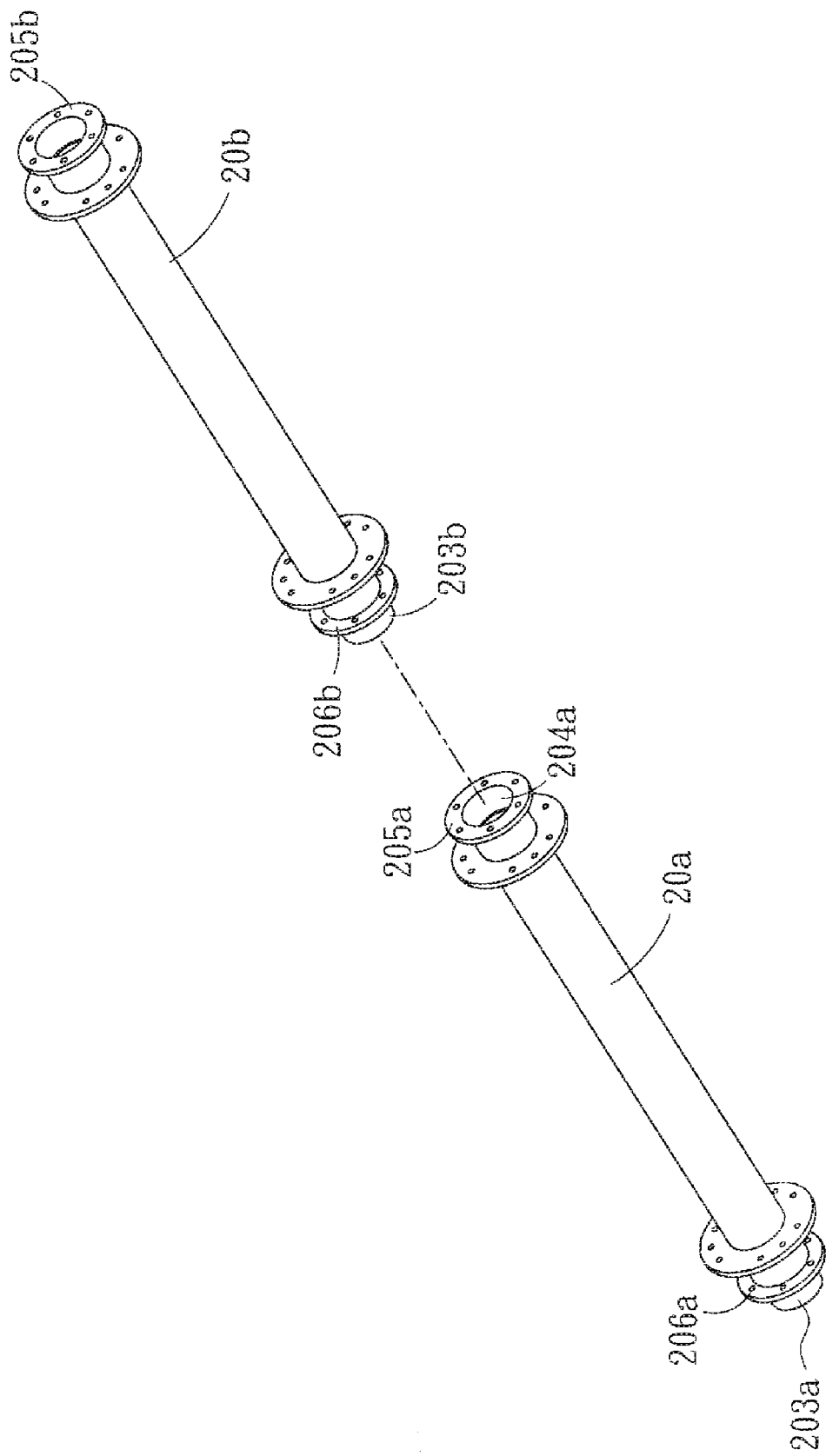
Figure 8C:
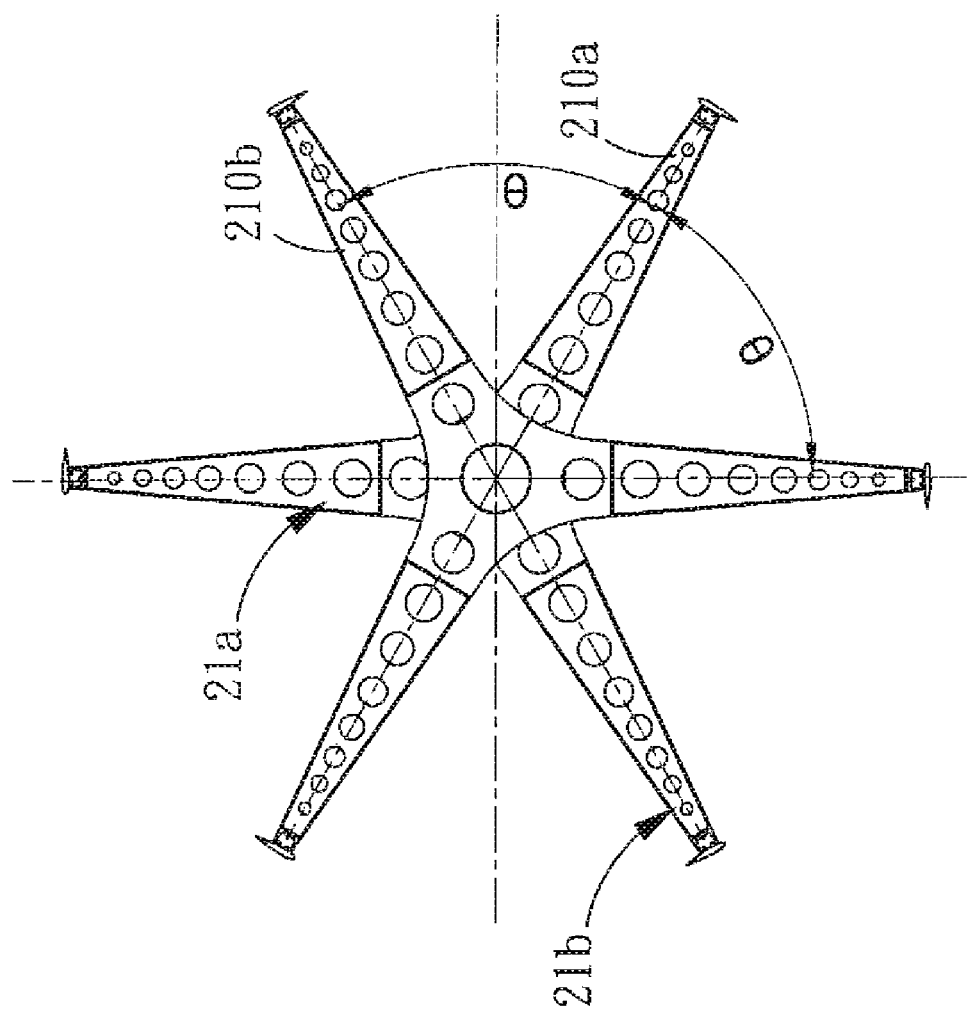

Please refer to FIG. 8A to FIG. 8C, which are a 3-D diagram of a fan module, a 3-D diagram of connected central axles and a top view diagram of a fan module according to one embodiment of the present invention. In the present embodiment, the aforesaid fan unit uses the central axle to connect a plurality of fan units. In the present embodiment, the fan module 3 comprises two serially connected fan units, but the present invention is not limited thereto. The fan module 3 comprises a first fan unit 2a and a second fan unit 2b. The first fan unit 2a comprises a first central axle 20a, a pair of first blade supports 21a and 22a and a plurality of first blades 23a. The second fan unit 2b comprises a second central axle 20b, a pair of second blade supports 21b and 22b and a plurality of second blades 23b. The first axle 20a and the second axle 20b have the same structure as the structure shown in FIG. 4A, and description thereof is not presented. In the present embodiment, the second protruding portion 203b of the second axle 20b is coupled inside the first concave portion 204a in the first axle 20a. Then, a plurality of fastening devices (comprising a screw nut and a screw bolt) are used to fasten the fixing base 205a on the first axle 20a and the fixing base 206b on the second axle 20b together. The second protruding portion 203b may be an external wall of a cylinder, while the concave portion 204a may be an inner wall inside a cylinder.

Figure 8D:
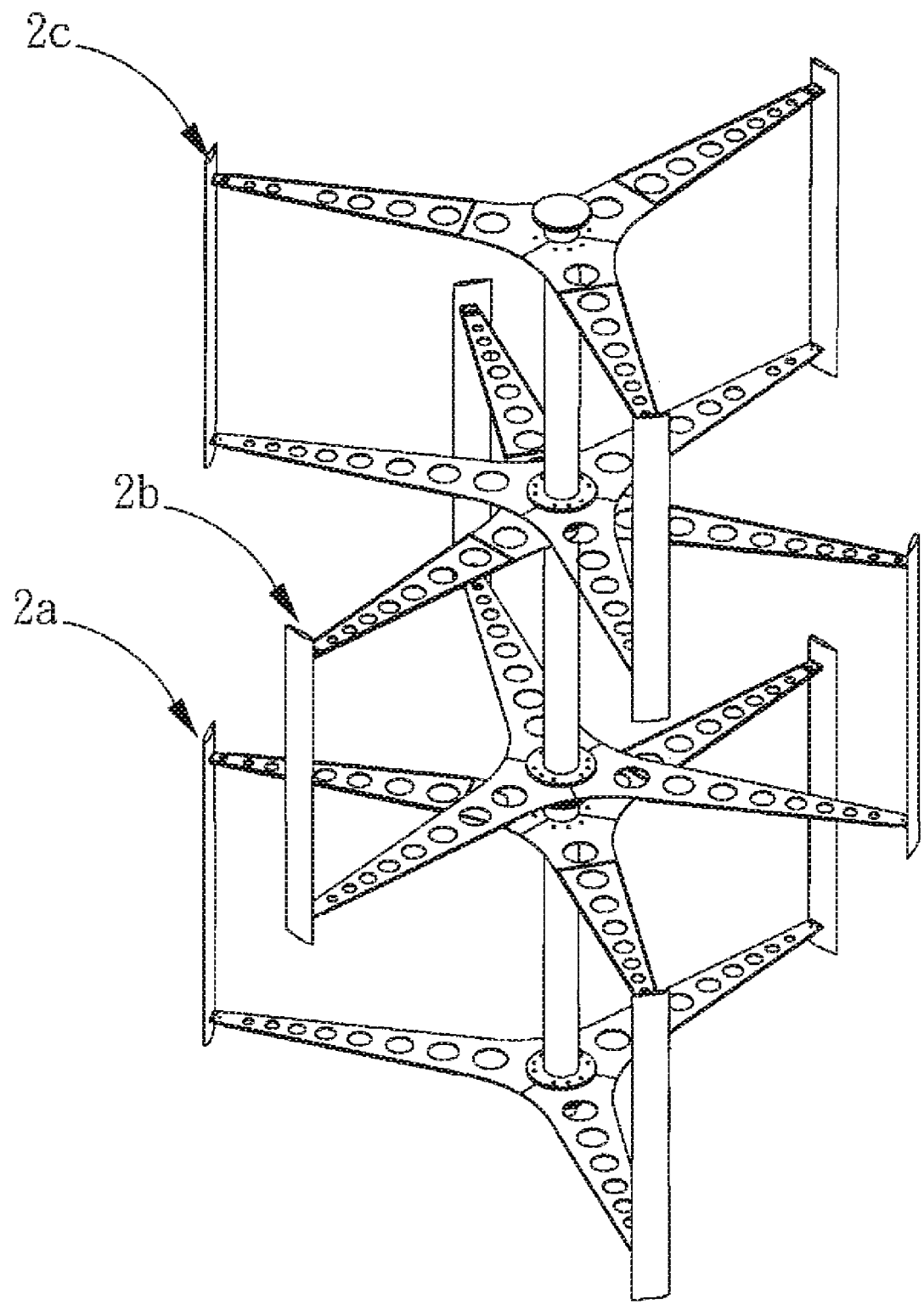
FIG. 8D is a 3-D diagram of a combination of a plurality of fan units according to the present invention.

The second axle 20b is provided with a fixing base 205b disposed thereon to be connected to another axle so that the fan units can be modulized as shown in FIG. 8D, which comprises three fan units 2a, 2b and 2c. The first axle 20a comprises a fixing base 206a at the bottom to be used as a fixing interface connecting the first axle 20a and the power generator unit 40. In the present embodiment, the blades of the two fan units are disposed as shown in FIG. 8C. The first fan unit and the second fan unit are disposed interlacingly so that a central position between any two adjacent first independent supporting arms of the first fan unit corresponds to one of the second independent supporting arms of the second fan unit. In the present invention, each of the pair of first blade supports 21a and each of the pair of second blade supports 21b comprise respectively three or four independent supporting arms so that the angle between any one of the first independent supporting arms 210a of the first fan unit and one of the second independent supporting arms 210b of the second fan unit disposed interlacingly with the first fan unit is 60 degrees when there are three independent supporting arms for both the first blade supports 21a and the second blade supports 21b, or the angle between any one of the first independent supporting arms 21a of the first fan unit and one of the second independent supporting arms 21b of the second fan unit disposed interlacingly with the first fan unit is 45 degrees when there are four independent supporting arms for both the first blade supports 21a and the second blade supports 21b.

Figure 9:
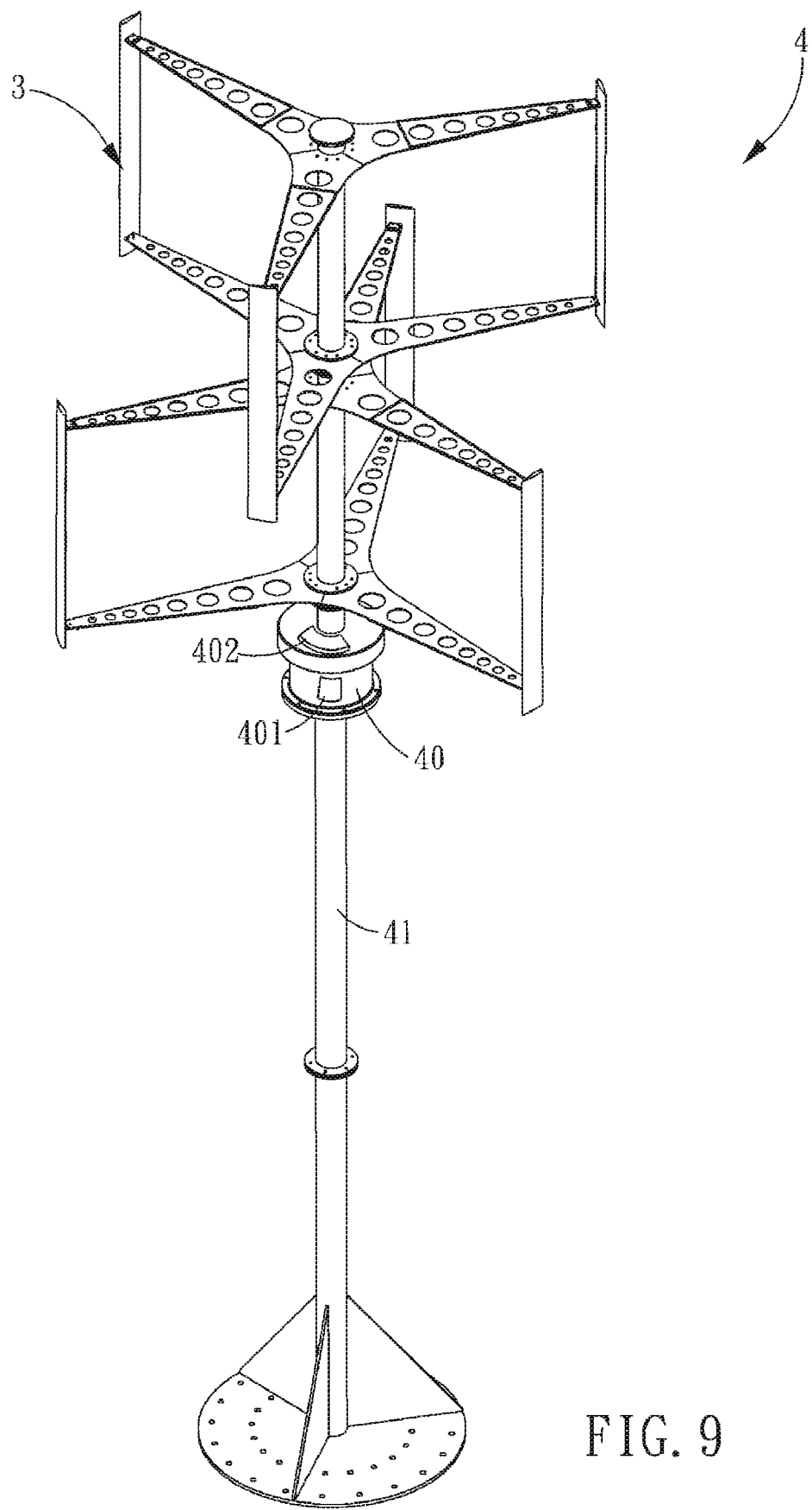
FIG. 9 is a 3-D diagram of a power generating system according to the present invention.

Please refer to FIG. 9, which is a 3-D diagram of a power generating system according to the present invention. A wind-power generating system 4 is formed after the module 3 in FIG. 8A is coupled to a power generator unit 40. The power generator unit comprises the windings and the axle, which is conventionally well-known and thus description thereof is not presented. The power generator unit 40 is further connected to a fixing frame 41 at one end on a position facing the wind such as the roof of a building. To prevent the power generating system from being damaged due to a blast of wind, the power generator unit 40 further comprises an electric controlled current brake 401 and a mechanical brake 402. The electric controlled current brake is used to lower or stop the rotation speed of the power generator unit when the rotation speed of the power generator unit increases to a certain extent. The mechanical brake operates in a similar way to manually or electronically stop or lower the rotation speed.

According to the above discussion, it is apparent that the present invention discloses a vertical-axis windpower fan unit using a central axle having modulized design for assembling or disassembling quickly and includes supporting arms with capability of weight adjustment so as to balance the rotation of the fan unit. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A vertical-axis windpower fan unit, comprising:
a central axle being provided with a connecting base on an external wall at each of both ends of the central axle, the central axle comprising a protruding portion at one end and a concave portion at the other end;
a pair of blade supports, each respectively comprising a plurality of independent supporting arms, the pair of blade supports being respectively connected to the connecting base at each of the both ends of the central axle so that the independent supporting arms of the pair of blade supports correspond to each other, wherein each of the independent supporting arms is respectively provided with a plurality of through holes disposed thereon; and
a plurality of blades, each respectively connected to the corresponding independent supporting arms of the pair of blade supports.

2. The vertical-axis windpower fan unit as recited in claim 1, wherein the plurality of through holes on each of the independent supporting arms are disposed as a line from the blades to the central axle with apertures getting larger.

3. The vertical-axis windpower fan unit as recited in claim 1, wherein each of the through holes is provided with a counter weight unit disposed therein.

4. The vertical-axis windpower fan unit as recited in claim 3, wherein the counter weight unit is a combination of a screw bolt and a screw nut.

5. The vertical-axis windpower fan unit as recited in claim 1, wherein each of the blade supports is formed in one process or an assembled module.

6. The vertical-axis windpower fan unit as recited in claim 1, wherein each of the blades is provided with a connecting unit fixedly disposed thereon to be connected to one of the corresponding independent supporting arms.

7. The vertical-axis windpower fan unit as recited in claim 1, wherein each of the blades is provided with a connecting unit disposed therein to protrude out of the blades, each connecting unit comprising a plurality of supporting bases and at least one connecting plate connected to the plurality of supporting bases in the blades, so that a protruding pillar extends from each of the supporting bases to protrude out of the blades and to be connected to the independent supporting arms.

8. The vertical-axis windpower fan unit as recited in claim 1, wherein both ends the plurality of blades are respectively fixedly disposed at an end portion of the plurality of independent supporting arms at the both ends of the central axle.

9. The vertical-axis windpower fan unit as recited in claim 1, wherein the plurality of blades are parallel with the central axle.

10. A vertical-axis windpower fan module, comprising:
a first fan unit, comprising:
a first central axle being provided with a first connecting base on an external wall at each of both ends of the first central axle, the first central axle comprising a first protruding portion at one end and a first concave portion at the other end;
a pair of first blade supports, each respectively comprising a plurality of first independent supporting arms, the pair of first blade supports being respectively connected to the first connecting base at each of the both ends of the first central axle so that the first independent supporting arms of the pair of first blade supports correspond to each other; and
a plurality of first blades, each respectively connected to the corresponding first independent supporting arms of the pair of first blade supports;
a second fan unit, comprising:
a second central axle being provided with a second connecting base on an external wall at each of both ends of the second central axle, the second central axle comprising a second protruding portion at one end and a second concave portion at the other end, wherein the second protruding portion is coupled to the first concave portion;
a pair of second blade supports, each respectively comprising a plurality of second independent supporting arms, the pair of second blade supports being respectively connected to the second connecting base at each of the both ends of the second central axle so that the second independent supporting arms of the pair of second blade supports correspond to each other; and
a plurality of second blades, each respectively connected to the corresponding second independent supporting arms of the pair of second blade supports,
wherein each of the pair of first blade supports and each of the pair of second blade supports comprise respectively three or four independent supporting arms so that the angle between any one of the first independent supporting arms of the first fan unit and one of the second independent supporting arms of the second fan unit disposed interlacingly with the first fan unit is 60 degrees when there are three independent supporting arms for both the first blade supports and the second blade supports, or the angle between any one of the first independent supporting arms of the first fan unit and one of the second independent supporting arms of the second fan unit disposed interlacingly with the first fan unit is 45 degrees when there are four independent supporting arms for both the first blade supports and the second blade supports.

11. The vertical-axis windpower fan module as recited in claim 10, wherein the first fan unit and the second fan unit are disposed interlacingly so that a central position between any two adjacent first independent supporting arms of the first fan unit corresponds to one of the second independent supporting arms of the second fan unit.

12. The vertical-axis windpower fan module as recited in claim 10, wherein each of the first independent supporting arms is respectively provided with a plurality of first through holes disposed thereon, and each of the second independent supporting arms is respectively provided with a plurality of second through holes disposed thereon.

13. The vertical-axis windpower fan module as recited in claim 12, wherein the plurality of first through holes on each of the first independent supporting arms are disposed as a line from the first blades to the first central axle with apertures getting larger, and the plurality of second through holes on each of the second independent supporting arms are disposed as a line from the second blades to the second central axle with apertures getting larger.

14. The vertical-axis windpower fan module as recited in claim 13, wherein each of the first or the second through holes is provided with a counter weight unit disposed therein.

15. The vertical-axis windpower fan module as recited in claim 14, wherein the counter weight unit is a combination of a screw bolt and a screw nut.

16. The vertical-axis windpower fan module as recited in claim 10, wherein each of the first or the second blade supports is formed in one process or an assembled module.

17. The vertical-axis windpower fan module as recited in claim 10, wherein each of the first or the second blades is provided with a connecting unit fixedly disposed thereon to be connected to one of the corresponding independent supporting arms.

18. The vertical-axis windpower fan module as recited in claim 10, wherein each of the first or the second blades is provided with a connecting unit disposed therein to protrude out of the first or the second blades, each connecting unit comprising a plurality of supporting bases and at least one connecting plate connected to the plurality of supporting bases in the first or the second blades, so that a protruding pillar extends from each of the supporting bases to protrude out of the first or the second blades and to be connected to the first or the second independent supporting arms.

19. The vertical-axis windpower fan module as recited in claim 10, wherein one side of the second fan unit is further coupled to a third fan unit.

20. The vertical-axis windpower fan module as recited in claim 10, wherein both ends the plurality of blades are respectively fixedly disposed at an end portion of the plurality of independent supporting arms at the both ends of the central axle.

21. The vertical-axis windpower fan module as recited in claim 10, wherein the plurality of blades are parallel with the central axle.

22. A vertical-axis windpower generating system, comprising:
   a first fan unit, comprising:
      a first central axle being provided with a first connecting base on an external wall at each of both ends of the first central axle, the first central axle comprising a first protruding portion at one end and a first concave portion at the other end;
      a pair of first blade supports, each respectively comprising a plurality of first independent supporting arms, the pair of first blade supports being respectively connected to the first connecting base at each of the both ends of the first central axle so that the first independent supporting arms of the pair of first blade supports correspond to each other, wherein each of the first independent supporting arms is respectively provided with a plurality of first through holes disposed thereon; and
      a plurality of first blades, each respectively connected to the corresponding first independent supporting arms of the pair of first blade supports;
   a second fan unit, comprising:
      a second central axle being provided with a second connecting base on an external wall at each of both ends of the second central axle, the second central axle comprising a second protruding portion at one end and a second concave portion at the other end, wherein the second protruding portion is coupled to the first concave portion;
      a pair of second blade supports, each respectively comprising a plurality of second independent supporting arms, the pair of second blade supports being respectively connected to the second connecting base at each of the both ends of the second central axle so that the second independent supporting arms of the pair of second blade supports correspond to each other, wherein each of the second independent supporting arms is respectively provided with a plurality of second through holes disposed thereon;
      a plurality of second blades, each respectively connected to the corresponding second independent supporting arms of the pair of second blade supports; and
      a power generator unit comprising a connecting concave portion at one end so as to be coupled to the first protruding portion, the power generator unit receiving a power generated by the first and second fan units being rotating to generate electricity.

23. The vertical-axis windpower generating system as recited in claim 22, wherein the plurality of first through holes on each of the first independent supporting arms are disposed as a line from the first blades to the first central axle with apertures getting larger, and the plurality of second through holes on each of the second independent supporting arms are disposed as a line from the second blades to the second central axle with apertures getting larger.

24. The vertical-axis windpower generating system as recited in claim 22, wherein each of the first or the second through holes is provided with a counter weight unit disposed therein.

25. The vertical-axis windpower generating system as recited in claim 24, wherein the counter weight unit is a combination of a screw bolt and a screw nut.

26. The vertical-axis windpower generating system as recited in claim 22, wherein each of the first or the second blade supports is formed in one process or an assembled module.

27. The vertical-axis windpower generating system as recited in claim 22, wherein each of the first or the second blades is provided with a connecting unit fixedly disposed thereon to be connected to one of the corresponding independent supporting arms.

28. The vertical-axis windpower generating system as recited in claim 22, wherein each of the first or the second blades is provided with a connecting unit disposed therein to protrude out of the first or the second blades, each connecting unit comprising a plurality of supporting bases and at least one connecting plate connected to the plurality of supporting bases in the first or the second blades, so that a protruding pillar extends from each of the supporting bases to protrude out of the first or the second blades and to be connected to the first or the second independent supporting arms.

29. The vertical-axis windpower generating system as recited in claim 22, wherein the power generator unit further comprises an electric controlled current brake and a manual mechanical brake.

30. The vertical-axis windpower generating system as recited in claim 22, wherein the power generator unit further comprises an electric controlled current brake and an electro mechanical brake.

31. The vertical-axis windpower generating system as recited in claim 22, wherein one side of the second fan unit is further coupled to a third fan unit.

* * * * *